(12) United States Patent
Roskind

(10) Patent No.: US 9,621,670 B2
(45) Date of Patent: *Apr. 11, 2017

(54) PARALLEL, SIDE-EFFECT BASED DNS PRE-CACHING

(71) Applicant: Google Inc., Mountain View, CA (US)

(72) Inventor: James Roskind, Redwood City, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/718,231

(22) Filed: May 21, 2015

(65) Prior Publication Data
US 2015/0256642 A1    Sep. 10, 2015

Related U.S. Application Data

(63) Continuation of application No. 14/175,102, filed on Feb. 7, 2014, now Pat. No. 9,064,026, which is a
(Continued)

(51) Int. Cl.
*H04L 29/08* (2006.01)
*G06F 17/30* (2006.01)
*H04L 29/12* (2006.01)

(52) U.S. Cl.
CPC .... *H04L 67/2847* (2013.01); *G06F 17/30902* (2013.01); *H04L 61/6009* (2013.01); *H04L 61/1511* (2013.01)

(58) Field of Classification Search
CPC ..... H04L 47/14; H04L 47/24; H04L 61/1511; H04L 61/6009; H04L 67/2847; H04W 40/02; H04W 4/008; G06F 17/30902
See application file for complete search history.

(56) References Cited

U.S. PATENT DOCUMENTS 5,297,249 A * 3/1994 Bernstein .......... G06F 17/30014
                                                 707/E17.009
5,923,848 A   7/1999 Goodhand et al.
(Continued)

FOREIGN PATENT DOCUMENTS

WO    WO-99/27680 A1    6/1999

OTHER PUBLICATIONS

Bouras, C., et al., "Predictive Prefetching on the Web and its Potential Impact in the Wide Area," World Wide Web: Internet and Web Information Systems, 2004, vol. 7, pp. 143-179; Kluwer Academic Publishers, The Netherlands.
(Continued)

*Primary Examiner* — Dung B Huynh
(74) *Attorney, Agent, or Firm* — McDermott Will & Emery LLP

(57) ABSTRACT

Embodiments of the present invention include methods and systems for domain name system (DNS) pre-caching. A method for DNS pre-caching is provided. The method includes receiving uniform resource locator (URL) hostnames for DNS pre-fetch resolution prior to a user hostname request for any of the URL hostnames. The method also includes making a DNS lookup call for at least one of the URL hostnames that are not cached by a DNS cache prior to the user hostname request. The method further includes discarding at least one IP address provided by a DNS resolver for the URL hostnames, wherein a resolution result for at least one of the URL hostnames is cached in the DNS cache in preparation for the user hostname request. A system for DNS pre-caching is provided. The system includes a renderer, an asynchronous DNS pre-fetcher and a hostname table.

20 Claims, 5 Drawing Sheets

Related U.S. Application Data continuation of application No. 12/197,907, filed on Aug. 25, 2008, now Pat. No. 8,677,018.

(56) References Cited

U.S. PATENT DOCUMENTS

| | | | |
|---|---|---|---|
| 6,016,512 A | 1/2000 | Huitema | |
| 6,023,726 A * | 2/2000 | Saksena | G06F 17/30902 707/E17.12 |
| 6,037,935 A * | 3/2000 | Bates | G06F 17/30882 707/E17.013 |
| 6,055,569 A * | 4/2000 | O'Brien | G06F 17/30902 707/E17.12 |
| 6,067,565 A * | 5/2000 | Horvitz | G06F 17/30861 707/E17.107 |
| 6,249,804 B1 * | 6/2001 | Lam | G06F 17/30902 707/E17.12 |
| 6,266,701 B1 * | 7/2001 | Sridhar | H04L 29/12066 370/465 |
| 6,542,991 B1 * | 4/2003 | Joy | G06F 9/30127 711/E12.039 |
| 6,560,511 B1 | 5/2003 | Yokoo et al. | |
| 6,606,645 B1 | 8/2003 | Cohen et al. | |
| 6,615,259 B1 | 9/2003 | Nguyen et al. | |
| 6,647,534 B1 | 11/2003 | Graham | |
| 6,857,122 B1 * | 2/2005 | Takeda | G06F 9/4843 718/100 |
| 6,993,591 B1 * | 1/2006 | Klemm | H04L 67/2847 707/999.002 |
| 6,999,717 B2 | 2/2006 | Spratt et al. | |
| 7,003,582 B2 | 2/2006 | Basso et al. | |
| 7,100,123 B1 * | 8/2006 | Todd | G06F 17/3061 707/E17.058 |
| 7,177,818 B2 | 2/2007 | Nair | |
| 7,343,397 B2 | 3/2008 | Kochanski | |
| 7,356,534 B2 | 4/2008 | Mohammed et al. | |
| 7,426,576 B1 | 9/2008 | Banga et al. | |
| 7,487,145 B1 | 2/2009 | Gibbs et al. | |
| 7,565,423 B1 | 7/2009 | Fredricksen | |
| 7,747,749 B1 * | 6/2010 | Erikson | G06F 17/30902 709/219 |
| 7,890,526 B1 | 2/2011 | Brewer et al. | |
| 7,941,762 B1 | 5/2011 | Tovino et al. | |
| 2001/0000083 A1 * | 3/2001 | Crow | G06F 17/30902 711/130 |
| 2001/0016840 A1 * | 8/2001 | Hijikata | G06F 17/30905 |
| 2001/0043600 A1 | 11/2001 | Chatterjee et al. | |
| 2002/0133487 A1 | 9/2002 | Oshins et al. | |
| 2003/0093461 A1 | 5/2003 | Suzuki et al. | |
| 2003/0154112 A1 | 8/2003 | Neiman et al. | |
| 2003/0200258 A1 * | 10/2003 | Hayashi | H04L 29/06 709/203 |
| 2003/0229673 A1 | 12/2003 | Malik | |
| 2004/0107278 A1 | 6/2004 | Emaru et al. | |
| 2004/0254913 A1 * | 12/2004 | Bernstein | G06F 17/30902 |
| 2004/0268219 A1 * | 12/2004 | Brown | G06F 8/24 715/205 |
| 2005/0015644 A1 | 1/2005 | Chu et al. | |
| 2005/0027892 A1 | 2/2005 | McCabe et al. | |
| 2005/0044242 A1 | 2/2005 | Stevens et al. | |
| 2005/0086194 A1 | 4/2005 | Suzuki et al. | |
| 2005/0114485 A1 * | 5/2005 | McCollum | H04L 41/0233 709/223 |
| 2005/0120180 A1 * | 6/2005 | Schornbach | G06F 17/30902 711/133 |
| 2005/0141491 A1 | 6/2005 | Low et al. | |
| 2005/0221770 A1 | 10/2005 | Shipshock | |
| 2005/0262248 A1 | 11/2005 | Jennings et al. | |
| 2005/0283468 A1 | 12/2005 | Kamvar et al. | |
| 2006/0047804 A1 * | 3/2006 | Fredricksen | G06F 17/30902 709/224 |
| 2006/0050862 A1 | 3/2006 | Shen et al. | |
| 2006/0069746 A1 | 3/2006 | Davis et al. | |
| 2006/0070012 A1 * | 3/2006 | Milener | G06F 3/0482 715/822 |
| 2006/0112094 A1 | 5/2006 | Sullivan et al. | |
| 2006/0129677 A1 | 6/2006 | Tamura | |
| 2006/0143568 A1 * | 6/2006 | Milener | G06F 17/30899 715/738 |
| 2006/0253583 A1 | 11/2006 | Dixon et al. | |
| 2006/0259462 A1 * | 11/2006 | Timmons | G06F 17/30979 |
| 2006/0265589 A1 | 11/2006 | Murtza et al. | |
| 2006/0271642 A1 | 11/2006 | Stavrakos et al. | |
| 2006/0282575 A1 | 12/2006 | Schultz et al. | |
| 2006/0294223 A1 | 12/2006 | Glasgow et al. | |
| 2007/0038718 A1 * | 2/2007 | Khoo | G06Q 10/107 709/206 |
| 2007/0050339 A1 | 3/2007 | Kasperski et al. | |
| 2007/0050351 A1 * | 3/2007 | Kasperski | G06F 17/30864 |
| 2007/0073833 A1 * | 3/2007 | Roy | H04L 67/02 709/217 |
| 2007/0079259 A1 * | 4/2007 | Sauve | G06F 3/04812 715/856 |
| 2007/0135962 A1 | 6/2007 | Kawabe et al. | |
| 2007/0140667 A1 * | 6/2007 | Uchimura | H04N 21/23614 386/248 |
| 2007/0183389 A1 * | 8/2007 | Clee | G06Q 10/10 370/347 |
| 2007/0250498 A1 * | 10/2007 | Pedersen | G06F 17/30646 |
| 2007/0256003 A1 * | 11/2007 | Wagoner | G06F 17/3089 715/205 |
| 2007/0294419 A1 | 12/2007 | Ulevitch | |
| 2008/0016034 A1 | 1/2008 | Guha et al. | |
| 2008/0040315 A1 | 2/2008 | Auerbach et al. | |
| 2008/0071881 A1 * | 3/2008 | Kronlund | G06Q 30/0258 709/217 |
| 2008/0195632 A1 | 8/2008 | Le Rouzic et al. | |
| 2008/0270449 A1 * | 10/2008 | Gossweiler | G06F 17/30817 |
| 2008/0294711 A1 * | 11/2008 | Barber | G06Q 30/02 709/201 |
| 2008/0319952 A1 | 12/2008 | Carpenter et al. | |
| 2009/0094377 A1 * | 4/2009 | Zahavi | G06F 17/30905 709/232 |
| 2009/0103126 A1 | 4/2009 | Park | |
| 2009/0119278 A1 * | 5/2009 | Cross | G06F 17/30864 |
| 2009/0171930 A1 | 7/2009 | Vaughan et al. | |
| 2009/0198779 A1 | 8/2009 | Agrawal et al. | |
| 2009/0199210 A1 * | 8/2009 | Smith, Jr. | H04L 67/02 719/315 |
| 2009/0210448 A1 | 8/2009 | Carlson | |
| 2009/0222584 A1 * | 9/2009 | Josefsberg | H04L 29/12066 709/245 |
| 2009/0271744 A1 | 10/2009 | Anders, Jr. | |
| 2009/0292696 A1 | 11/2009 | Shuster | |
| 2010/0005086 A1 | 1/2010 | Wang et al. | |
| 2010/0049872 A1 | 2/2010 | Roskind | |
| 2010/0050112 A1 * | 2/2010 | Chiu | G06F 9/4448 715/781 |
| 2010/0114822 A1 | 5/2010 | Pollock et al. | |
| 2010/0146415 A1 | 6/2010 | Lepeska | |
| 2010/0154055 A1 | 6/2010 | Hansen | |
| 2010/0191856 A1 | 7/2010 | Gupta et al. | |
| 2011/0035402 A1 | 2/2011 | Agrawal et al. | |
| 2012/0150829 A1 * | 6/2012 | Bourbonnais | G06F 17/30578 707/703 |
| 2013/0145273 A1 | 6/2013 | Hymel et al. | |

OTHER PUBLICATIONS

Cohen et al., "Prefetching the Means for Document Transfer: A New Approach for Reducing Web Latency", IEEE INFOCOM 2000, 2000, pp. 854-863.

Cohen et al., "Prefetching the Means for Document Transfer: A New Approach for Reducing Web Latency," Computer Networks, vol. 39. No. 4, Jul. 15, 2002, pp. 437-455.

Reinhard P, Klemm, "WebCompanion: A Friendly Client-Side Web Prefetching Agent", IEEE Transactions on Knowledge and Data Engineering, vol. 11, No. 4, Jul./Aug. 1999, pp. 577-594.

(56) References Cited

OTHER PUBLICATIONS

Wang, et al., "Prefetching in World Wide Web," IEEE, 1996, pp. 28-32.

* cited by examiner

US 9,621,670 B2

PARALLEL, SIDE-EFFECT BASED DNS PRE-CACHING

CROSS REFERENCE TO RELATED APPLICATIONS

This application is a continuation of U.S. application Ser. No. 14/175,102, filed Feb. 7, 2014, which is a continuation of U.S. application Ser. No. 12/197,907, filed Aug. 25, 2008, each of which is hereby incorporated by reference in its entirety.

BACKGROUND

Field of the Invention

Embodiments of the present invention relate to applications and the World Wide Web.

Background Art

A web browser is a software application that allows a user to view or download content that is available on a network, such as on a website on the World Wide Web. Content may include text, files, images, audio, video and personal communications. A browser may also allow a user to enter, upload, or execute content. Browsers run on personal computers and mobile devices. Commonly used browsers may presently include, for example, FIREFOX, INTERNET EXPLORER, SAFARI, and OPERA.

Browsers may use a number of protocols and standards to obtain or manage content flow. Most browsers primarily use hypertext transfer protocol (HTTP) to fetch content and webpages. Webpages are located using a uniform resource locator (URL), which identifies where the webpage may be found. Webpages may be retrieved using the IP address of the computer holding the webpage content. In order to be more memorable and human friendly, an IP address or hierarchy may be represented by a hostname (such as www.google.com). A hostname is a domain name that has one or more associated IP addresses. A hostname request is a request to navigate to a webpage using a URL hostname. For example, a hostname request may include a user clicking on a link on a web page or typing a hostname in a URL bar. Hostnames and other information associated with domain names may be resolved or translated to IP addresses using the Domain Name System (DNS). This DNS resolution system is sometimes referred to as the "phone book" for the Internet.

DNS resolution requires either looking in a local computer cache or querying a set of DNS servers over the network. A request for DNS resolution may also be known as a DNS lookup call. DNS utilizes authoritative name servers to help map domain names to IP addresses in order to avoid having all the information in a single, central DNS server. These and other intermediate name servers may cache DNS resolution information to shorten DNS resolution times.

For example, FIG. 1 illustrates an exemplary system 100 that performs DNS resolution. When network traffic is required, UDP packets are sent to a DNS resolver, and eventually a UDP response is provided. DNS resolutions may exist in a local cache, such as operating system DNS cache 110. If not, the next resolver is commonly LAN firewall 120, which necessitates traffic from the firewall resolver to another resolver, such as ISP 140, over network 130. The latency time of two such round trips may presently be no less than 40 ms compared to 0-3 ms when operating system DNS cache 110 is the source of the resolution. If resolution information is not in the cache of firewall 120 or ISP 140, other intermediate servers 160 may be queried over one or more networks 150. If the hostname is yet to be resolved, authoritative server 170 or main DNS server 180 will be queried and latency will be further increased. Failures, delays and lost packets contribute to accumulated latency that can commonly exceed 1 second or longer. Longer latency times cause discomfort to users of a web browser.

DNS resolution times can be reduced. When DNS resolution occurs for a website, cached results will make future visits to a website quicker. For instance, a web page when first visited may have a portion of its presentation latency attributable to DNS resolution, which could exceed 120 milliseconds. Future visits will get DNS queries from cache at no cost.

User-perceived latency may be reduced through DNS pre-fetching. DNS pre-fetching resolves or fetches a variety of hostnames through the DNS in advance of user activities, anticipating that one of those name resolutions will probably be useful in an upcoming user webpage or hostname request. However, browsers currently do not do DNS pre-fetching for a number of reasons. Engineers have not implemented techniques for DNS pre-fetching in browsers, fearing that the delicate complexity of the network stack would be compromised. Also, engineers have thought that implementations would have to be adapted for each different network application or browser. Further, engineers have worried that any additional network code, processing or complexity prior to a user request would only further increase latency.

BRIEF SUMMARY

Embodiments described herein refer to systems and methods for domain name system (DNS) pre-caching. Embodiments described herein also refer to systems and methods for DNS pre-caching for accelerating application startup. According to an embodiment, a method for domain name system (DNS) pre-caching is provided. The method may include receiving one or more uniform resource locator (URL) hostnames for DNS pre-fetch resolution prior to a user hostname request for any of the URL hostnames. The method may also include making a DNS lookup call for at least one of the URL hostnames that are not cached by a DNS cache prior to the user hostname request. The method may further include discarding at least one IP address provided by a DNS resolver for the URL hostnames, wherein a resolution result for at least one of the URL hostnames is cached in the DNS cache in preparation for the user hostname request. According to a further embodiment, the DNS cache may be an operating system DNS cache.

According to another embodiment, a system for domain name system (DNS) pre-caching comprising a browser is provided. The browser may be configured to receive one or more uniform resource locator (URL) hostnames for DNS pre-fetch resolution prior to a user hostname request for any of the URL hostnames. The browser may be further configured to make a DNS lookup call for at least one of the URL hostnames that are not cached by a DNS cache prior to the user hostname request. The browser may also be configured to discard at least one IP address provided by a DNS resolver for the URL hostnames, wherein a resolution result for at least one of the URL hostnames is cached in the DNS cache in preparation for the user hostname request.

According to a further embodiment, a system for domain name system (DNS) pre-caching is provided. The system may include a DNS pre-fetcher configured to make a DNS lookup call for one or more uniform resource locator (URL)

hostnames and discard an IP address for at least one of the URL hostnames prior to a user hostname request for any of the URL hostnames. The resolution result for at least one of the URL hostnames may be cached in the DNS cache in preparation for the user hostname request. The system may further include a renderer configured to pass the URL hostnames to the DNS pre-fetcher.

Further embodiments, features, and advantages of the invention, as well as the structure and operation of the various embodiments of the invention are described in detail below with reference to accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF THE INVENTION

Figure 1:
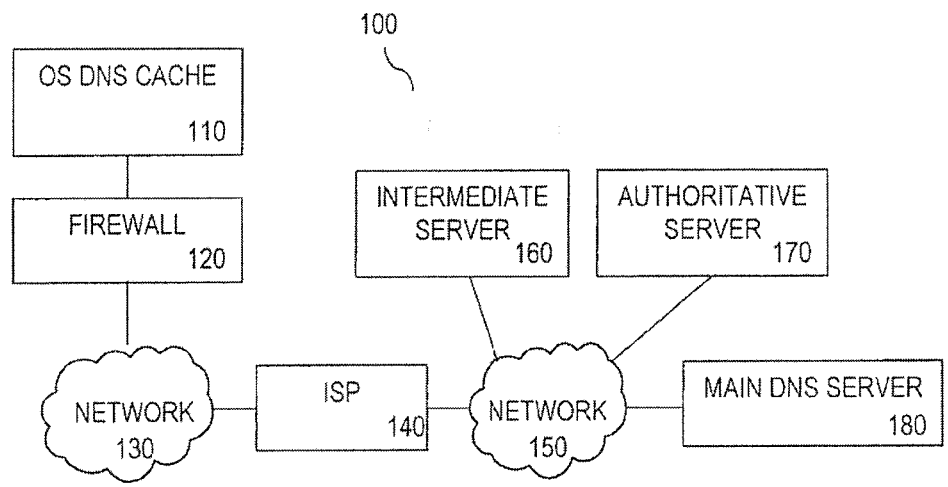
FIG. 1 is a diagram showing an existing system for DNS hostname resolution, according to an embodiment of the present invention.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The goal of Domain Name System (DNS) pre-fetching is to reduce user-perceived latency when surfing the Internet. Perceived network code complexity has prevented an effective implementation of DNS pre-fetching in browsers. A simpler implementation does not involve creating an additional pre-fetching DNS cache, but rather "pre-warming up" an existing DNS cache for actual browser network stack accesses. A cache is considered "warm" if it happens to contain a subset of data that later proves useful. Usually a cache is warmed up by actual use in a process and not by a system deliberately trying to pre-populate a cache. Loading a cache is often expensive and cache size may be restricted, causing some data to be evicted in favor of other data without proof of utility of the new data. With DNS caching, according to many embodiments of the present invention, cache size is not a significant restriction.

One or more parallel threads may be executed to perform hostname-to-IP address DNS resolution. Such a thread can process a hostname, as though it were looking the IP address up, but not actually obtain and use the IP address to render the web page for the IP address. In fact, results of such lookups may be discarded, or deleted, in some implementations. Instead, the act of calling a DNS query function, which is often passed to the operating system, causes IP resolutions to be stored in a DNS lookup system's cache. This is "pre-caching". Later, before a DNS cache expires, a thread can fetch the resource (e.g., URL) and the underlying cache will cause that fetch to be expedited. As a result, there will be little or no latency delay in obtaining a DNS resolution since it is already in the cache. This leads to dramatic savings in later URL navigation. Embodiments of the present invention include methods and systems for domain name system (DNS) pre-caching.

According to a feature, DNS resolutions are pre-cached as a "side effect" of parallel DNS queries. As described above, parallel threads may be executed to do DNS resolution as though they were looking the IP addresses up. This action, as a "side-effect", loads a process and local cache (e.g. operating system cache) with DNS resolutions. Because such an implementation benefits from the "side-effect" of a normal DNS resolution query, it avoids the complexity of interacting with the traditional network stack that is resolving names. Latency measurements have produced significant and surprising positive results.

Hostnames for DNS pre-caching may be selected or gathered in various ways, increasing the utility of DNS pre-caching. Such DNS pre-caching can make better use of extra CPU time that exists while a browser is waiting for a user to select a link. DNS pre-caching may also be used to accelerate application startup. Such utilizations of DNS pre-caching will be discussed in further embodiments herein.

Figure 2:
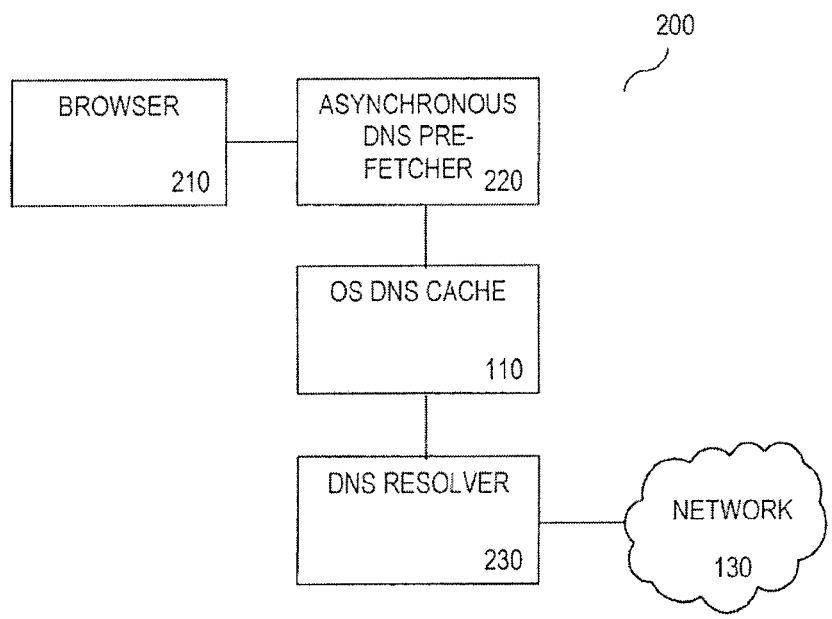
FIG. 2 is a diagram of a system for DNS pre-caching, according to an embodiment of the present invention.

FIG. 2 illustrates an exemplary system 200 for DNS pre-caching, according to an embodiment. System 200 includes browser 210, asynchronous DNS pre-fetcher 220, operating system DNS cache 110 and DNS resolver 230. These components may be coupled directly or indirectly, such as over a network. DNS resolver 230 may be coupled to one or more networks 130. According to an embodiment, browser 210 may include any device, application or module that enables a user or computer to navigate and/or retrieve data from another data source, typically over a network. Browser 210 may include any conventional browser including but not limited to for example, FIREFOX available from Mozilla Foundation Inc., INTERNET EXPLORER available from Microsoft Corp., SAFARI available from Apple Computer, Inc., and OPERA available from Opera Software ASA. Browser 210 may also be a multi-process browser as described in "Multi-Process Browser Architecture," by Fisher et al., U.S. Provisional Appl. No. 61/052,719, filed May 13, 2008. According to a further embodiment, browser 210 may also be configured to use any number of protocols, including protocols such as HTTP.

Browser 210 may exist within or be executed by hardware in a computing device. For example, browser 210 may be software, firmware, or hardware or any combination thereof in a computing device. A computing device can be any type of computing device having one or more processors. For example, a computing device can be a workstation, mobile device (e.g., a mobile phone, personal digital assistant, or laptop), computer, game console, set-top box, kiosk, embedded system or other device having at least one processor and memory.

According to an embodiment, browser 210 may be configured to receive one or more uniform resource locator (URL) hostnames for DNS pre-fetch resolution prior to a user hostname request for any of the one or more URL hostnames. A user hostname request may include, but is not limited to, clicking on a link, or pressing "Enter" or "Return" upon entering or selecting a URL address. A user hostname request may be any action or gesture by a user confirming or committing to a URL address or hostname. Browser 210 may also be configured to make a DNS lookup call for at least one of the one or more URL hostnames that are not cached by a DNS cache prior to the user hostname request. Browser 210 may be further configured to discard at least one IP address provided by a DNS resolver for the one or more URL hostnames, where a resolution result for at least one of the one or more URL hostnames is cached in a DNS cache in preparation for the user hostname request. According to a further embodiment, browser 210 may provide one or more URL hostnames to asynchronous DNS pre-fetcher.

According to an embodiment, asynchronous DNS pre-fetcher 220 may be configured to make a DNS lookup call for one or more uniform resource locator (URL) hostnames and discard an IP address for at least one of the URL hostnames prior to a user hostname request for any of the URL hostnames, where a resolution result for at least one of the URL hostnames is cached in a DNS cache in preparation for the user hostname request. Many operating systems provide DNS resolution service asynchronously. That is, rather than calling a function and "waiting" until it returns, a function may be called and it will "call back" when it has an answer. As a result, it can be called with many requests (while prior requests are still pending). Asynchronous DNS pre-fetcher 220 may act in a similar asynchronous fashion. Also, DNS pre-fetcher 220 may act as a module separate from the network stack for DNS resolution. This may lead to a simpler implementation.

If DNS resolutions are not cached in OS DNS cache 110, hostnames may be provided to DNS resolver 230. DNS resolver 230 may require further queries over one or more networks 130 to resolve the hostnames provided by DNS pre-fetcher 220.

Figure 3:
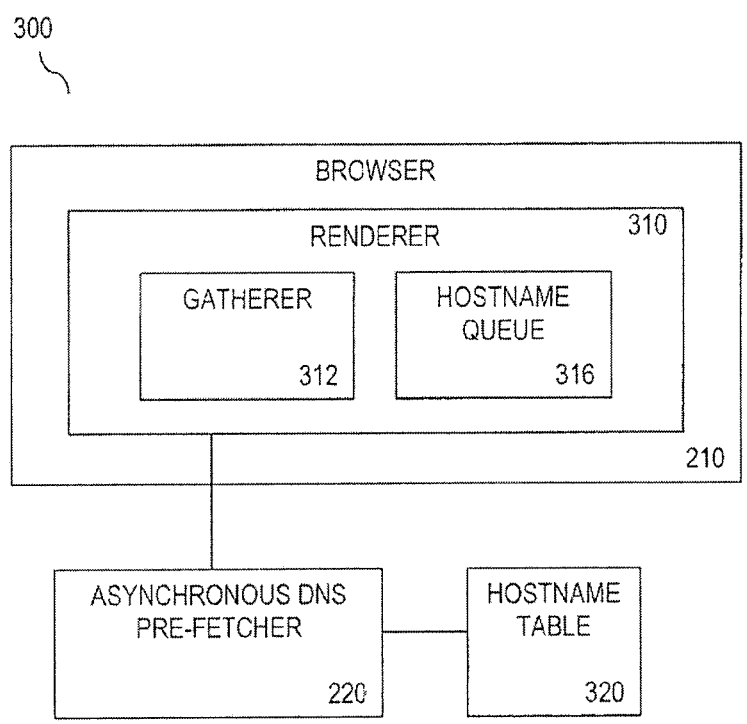
FIG. 3 is a more detailed diagram of a system for DNS pre-caching, according to an embodiment of the present invention.

FIG. 3 illustrates an exemplary system 300 for DNS pre-caching, according to an embodiment. System 300 includes browser 210, asynchronous DNS pre-fetcher 220 and hostname table. System 300 may also include renderer 310, which may or may not exist in browser 210. These components may be coupled together directly or indirectly.

According to an embodiment, hostname table 320 may be a data structure configured to store DNS pre-fetch information for one or more URL hostnames. DNS pre-fetch information may include, but is not limited to: DNS resolution tracking information (is DNS task queued, assigned, resolved, etc.?) for each hostname; transition time for such tasks; when was the hostname resolved last; how many other resolutions have taken place since a hostname's last resolution (useful for estimating cache eviction); and a central hash table for hostnames and DNS resolution events. DNS pre-fetch information may also include information for services relating to: startup and teardown, enabling and disabling DNS pre-fetching, providing global entry points (requiring no context or instance) for DNS resolution requests, and monitoring and measuring performance of actual network stack resolutions required for web navigation. Any combination of the above DNS pre-fetch information may be included in other components of system 300. According to a further embodiment, a cache eviction time may be determined by DNS pre-fetcher 220 based on DNS pre-fetch information in hostname table 320. DNS pre-fetcher 220 may be further configured to make DNS lookup calls for only the one or more URL hostnames that have not had a DNS lookup call within a determined cache eviction time.

Renderer 310 may be a module that displays (or renders) data, such as an HTML page, according to an embodiment. Renderer 310, in the course of analyzing a page, may ask the environment about its context. One example of context is whether a link was already visited. Such context may be used to identify possible links to gather for pre-fetching. According to an embodiment, renderer 310 may be configured to gather hostnames.

Hostnames gathered or captured by renderer 310 may be placed, either temporarily or persistently, into hostname queue 316 by renderer 310 or browser 210, according to an embodiment. Hostname queue 316 may be a data structure or an allocation in memory. Hostname queue 316 may exist in or be provided by renderer 310 or browser 210. Hostname queue 316 may be dynamic or static. According to an embodiment, when an individual or dedicated worker thread is available, it may gather one or more hostnames from hostname queue 316 for processing. A browser or renderer worker thread may make a blocking DNS lookup call for an assigned hostname and wait until a resolution is returned. Once there is a resolution (or name-not-found result), the worker thread may update hostname information in hostname table 320. Such information can prevent pre-fetching the same name too often. If an IP address is provided by DNS resolver 230, it may be discarded, according to a further embodiment. Having a collection of worker threads will prevent a slow DNS resolution from holding up quicker asynchronous resolutions from the remainder of hostname queue 316. Browser 210, DNS pre-fetcher 220, or renderer 310 may perform tasks described above with one or more parallel threads.

Hostnames for DNS pre-fetching may be selected or determined in a number of ways. According to an embodiment, browser 210 or renderer 310 may include gatherer 312. Gatherer 312 may be configured to gather one or more URL hostnames from one or more URL links in a web page prior to a user selecting a URL link in the web page. A web page may be scanned for links on the page. In some cases, all links on a page may be gathered. Limitations can be placed on how many hostnames are gathered from a webpage in cases where there are a large number of links. In these cases, renderer 310 may be configured to limit URL hostnames that are passed based upon a number of URL links on a webpage. It could be counter-productive if valuable hostnames where evicted from the DNS cache by hostname links that are less likely to be selected. In other cases, gatherer 312 may be configured to avoid duplicate hostnames. According to an embodiment, anchor tags (links that are colored to indicate whether the link was visited or not) may be parsed and hostnames extracted. According to a further embodiment, gatherer 312 may gather hostnames as seen on a "results" page from a search.

According to an embodiment, gatherer 312 may be configured to gather one or more URL hostnames from one or more predicted hostnames based upon entering activity in a URL address bar prior to a user completely entering a hostname. Entering activity may include a user typing a URL address in the address bar. Entering activity may also include plausible hostnames that are predicted or proposed to a user based on autocompletion logic, while the user is typing. Autocompletion proposals may be based on previously entered URLs, query submissions, or immediate termination of typing by the user (completion of explicit user URL entry). Each proposed hostname may be processed and resolved before a user finalizes his or her entry, whether or not a user ultimately agrees with a self-completing prediction.

Some links and advertisements may not contain a true URL link but only the URL of a server redirector. According to an embodiment, a link tag on a page may be augmented with a hint to the browser that a given domain will be visited. Observed link tags may cause a corresponding hostname to be inserted into hostname queue 316. According to a further embodiment, a relationship value in a link tag associated with at least one of the one or more URL hostnames may be replaced. A replacement value may be associated with DNS pre-fetching. For example, a link tag may appear as "<link rel="DNS-pre-fetch" href=http://www.hostnametoprefeth.com/> Such actions may be performed by renderer 310, gatherer 312, or browser 210.

According to an embodiment, gatherer 312 may be configured to gather one or more URL hostnames based upon one or more omni-box suggestions that appear based on user activity prior to a user selecting an omni-box suggestion. An omni-box is a query box provided by browser 210 that assists with routine surfing. An omni-box may suggest to a user (via a highlighted line) that a certain course of action be taken. For example, actions may include visiting a link that was visited in the past, doing a search provider query, or visiting a new URL. When such a suggestion is made, a potential URL is constructed. That URL hostname may be gathered by gatherer 312. According to a further embodiment, a user may enter a search query in an omni-box. A hostname may be fully resolved between when a user enters a URL and when he or she presses "Enter". When browser 210 determines a search will be performed, it forms a search URL and a search provider's hostname is gathered by gatherer 312. In some cases, search time may be reduced by 120 ms.

According to an embodiment, gatherer 312 may be configured to gather one or more URL hostnames based upon one or more URL links on a web page that a user has moused over but has not selected. In some cases, this may be based on a period of time in which a user has a mouse pointer resting on a link or in proximity to a link. The hostname for the link may be pre-fetched while a user considers clicking on the link.

According to a further embodiment, renderer 310 may be configured to pass one or more URL hostnames to DNS pre-fetcher 220 or browser 210. Hostnames may also be passed in an array. In another embodiment, each individual array transmission can be guaranteed to be internally duplicate free. Renderer 310 may be configured to avoid providing duplicate hostnames. Renderer 310 may also be configured to avoid providing variations on hostnames that would lead DNS pre-fetcher 220 to make superfluous DNS lookup calls. According to another embodiment, an API may pre-populate a DNS cache.

Figure 4:
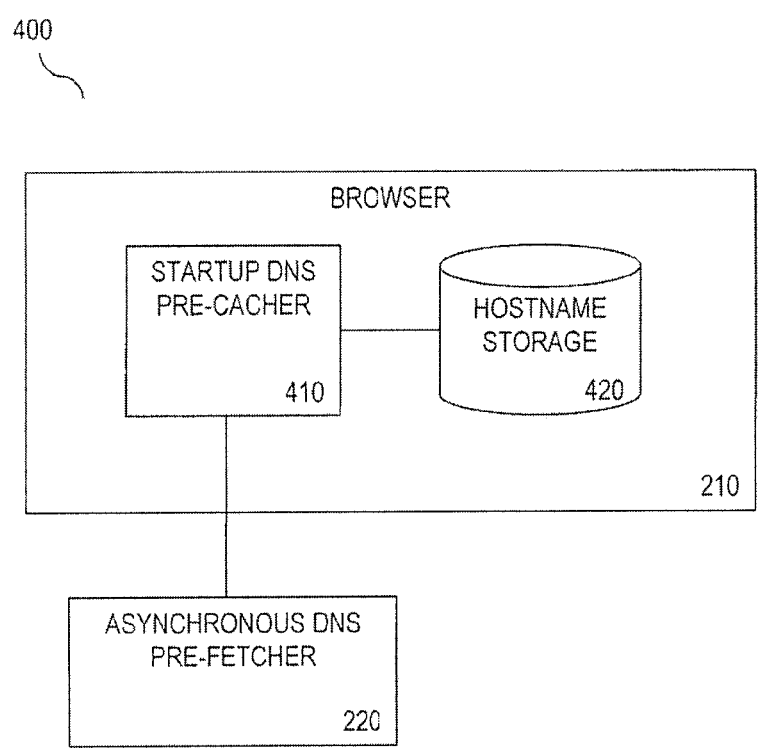
FIG. 4 is a diagram of a system for accelerating application startup using DNS pre-caching, according to an embodiment of the present invention.

DNS pre-caching may be used for other purposes such as reducing application startup time. FIG. 4 illustrates an exemplary system 400 for accelerating application startup, according to an embodiment. System 400 includes browser 210, startup DNS pre-cacher 410, asynchronous DNS pre-fetcher 220 and hostname storage 420. These components may be coupled together directly or indirectly. Startup DNS pre-cacher 410 and hostname storage 420 may exist in browser 210.

According to an embodiment, hostname storage 420 may be a storage device configured to persistently store a number of uniform resource locator (URL) hostnames based on one or more hostname requests made by one or more users during use of an application. Hostname storage 420 may store hostnames requested by one or more applications. The selection of hostnames to be stored may be an adaptive process. Startup DNS pre-cacher 410 may monitor all URL fetches that are made during startup. According to a further embodiment, only a select subset of URL fetches may be monitored. For example, monitoring may exclude resolutions that are already cached and require no network activity. Monitoring may also exclude resolutions of names noted in a pre-specified list of names to ignore. Startup DNS pre-cacher 410 may or may not be a component of browser 210. The number of stored hostnames may or may not be pre-determined.

According to an embodiment, DNS pre-cacher 410 may store a number of hostnames based upon a number of first hostnames requested by one or more users following startup of the application. For example, the first ten hostnames found in URLs may be stored in hostname storage 420. According to a further embodiment, a variable number of hostnames may be stored in hostname storage 420. For example, all hostnames resolved in the first N seconds, such as the first 10 seconds, may be stored. As another example, all hostnames requiring resolution in the first 5 minutes, with resolution time greater than some significant delay, such as 500 ms, may be stored. In some embodiments, a variable number of hostnames may be bounded by a fixed limit, for example, not to exceed 10 names.

According to another example, a number of hostnames based upon a number of most recent hostnames requested by one or more users during use of the application may be stored in hostname storage 420. In a further example, a number of hostnames based upon a number of most frequently requested hostnames by one or more users during use of the application may be stored. In another example, a number of hostnames based upon any combination of first hostnames following startup, most recent hostnames, or most frequent hostnames requested by one or more users during use of the application may be stored. According to another embodiment, some hostnames stored in hostname storage 420 may be preprogrammed hostnames. Stored hostnames may also be generated or received from another application.

According to an embodiment, startup DNS pre-cacher 410 may be configured to pass a number of hostnames to asynchronous DNS pre-fetcher 220 from the hostname storage device upon a next startup of the application. For example, such a start up may be when the application is opened or selected to run. This start up may be the first time the application is started. This start may also be a startup subsequent to a closing of the application (also called a next start up). In other words, an earlier run of the application may have occurred and the application may have been previously closed. In this case, a start up may be a next start up subsequent to a closing of the application. DNS pre-fetcher 220 may be configured to make a DNS lookup call for at least one stored hostname prior to a hostname request for any of the stored hostnames, wherein a resolution result for at least one of the stored hostnames is cached in the operating system DNS cache in preparation for the hostname request. According to an embodiment, hostname requests may be initiated by an application. An application may perform DNS lookups during startup in anticipation of hostname requests by the application. Such hostname requests may take place towards the end of the startup or at some time following startup. DNS lookups may also be made by the application in advance of any predicted user hostname requests. According to another embodiment, hostname requests may initiated by the application in response to a user gesture or a user hostname request. According to a further embodiment, DNS pre-fetcher 220 may be configured to discard at least one IP address provided by an operating system DNS resolver for stored hostnames, where a resolution result for at least one of the stored hostnames is cached in the operating system DNS cache in preparation for the hostname request.

Embodiments described herein for accelerated application startup reduce real-world application startup time. Without such an optimization, a user would first wait for the application to start, and then wait for a page to be fetched (including DNS lookup). Resolving hostnames in advance improves the application experience for the user. Hostnames that can be pre-fetched may also include a user's home page, domains commonly used in that page, or hostnames that are used in number of standard tabs that are typically loaded at startup. DNS pre-cacher 410 or DNS pre-fetcher 220 may be configured to perform tasks using one or more parallel threads.

Figure 5:
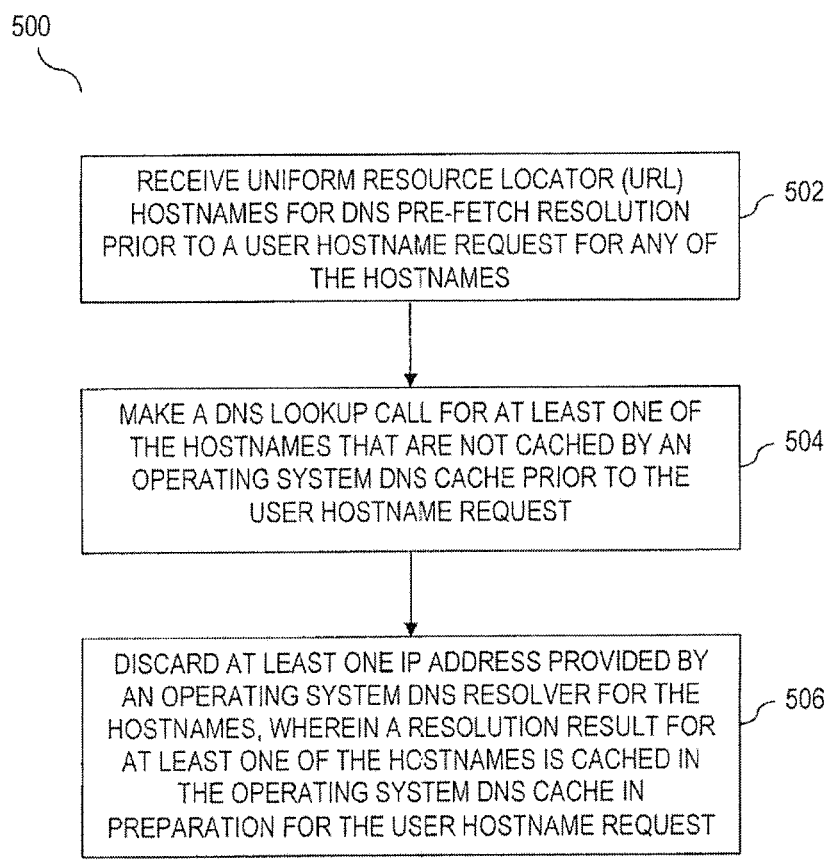
FIG. 5 is a flowchart illustrating a method for DNS pre-caching, according to an embodiment of the present invention.

FIG. 5 illustrates an exemplary method 500 for DNS pre-caching, according to an embodiment. In step 502, URL hostnames for DNS pre-fetch resolution may be received prior to a user hostname request for any hostnames. In step 504, a DNS lookup call for at least one of the URL hostnames that are not cached by a DNS cache is made prior to the user hostname request. In step 506, at least one IP address provided by a DNS resolver for one or more URL hostnames may be discarded, where a resolution result for at least one of the URL hostnames is cached in a DNS cache in preparation for the user hostname request. According to an embodiment, steps 502, 504 and 506 may be performed by DNS pre-fetcher 220.

Figure 6:
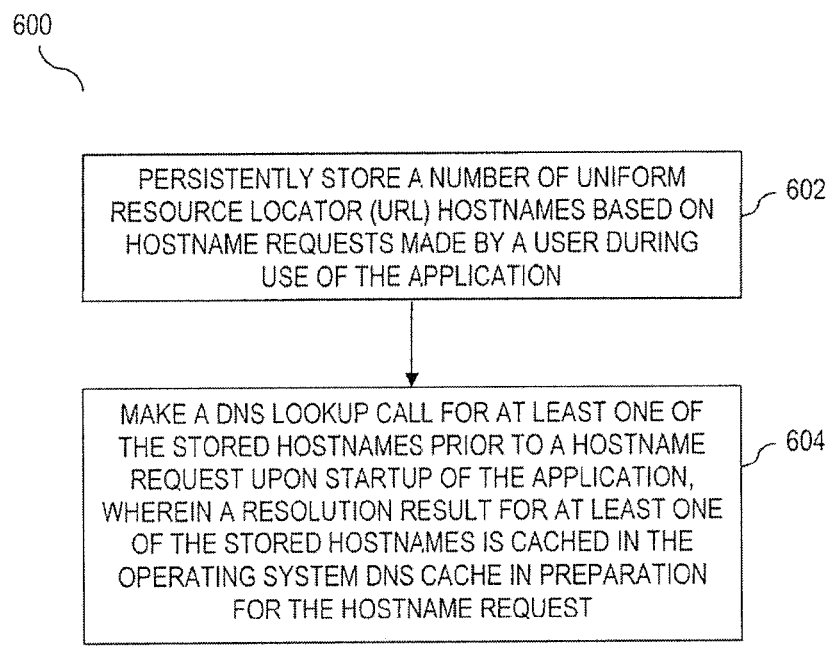
FIG. 6 is a flowchart illustrating a method for accelerating application startup using DNS pre-caching, according to an embodiment of the present invention.

FIG. 6 illustrates an exemplary method 600 for accelerated application startup, according to an embodiment. In step 602, a number of uniform resource locator (URL) hostnames based on one or more hostname requests made by one or more users during use of the application are persistently stored. According to an embodiment, DNS pre-cacher 410 may be configured to perform step 602. Hostnames may be stored in hostname storage 420. In step 604, a DNS lookup call for at least one of the stored hostnames may be made prior to a hostname request initiated by the application, where a resolution result for at least one of the stored hostnames is cached in operating system DNS cache in preparation for the hostname request. This may be performed upon startup of the application. According to a further embodiment, this startup may be a next startup subsequent to a closing of the application. According to an embodiment, step 604 may be performed by DNS pre-fetcher 220. According to another embodiment, step 604 may perform a DNS lookup call in preparation for a hostname request.

Aspects of the present invention, for exemplary system 200, system 300, system 400, method 500 and/or method 600 or any part(s) or function(s) thereof may be implemented using hardware, software modules, firmware, tangible computer readable media having instructions stored thereon, or a combination thereof and may be implemented in one or more computer systems or other processing systems.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for domain name system (DNS) pre-caching comprising:
   selecting one or more uniform resource locator (URL) hostnames for DNS pre-fetch resolution from one or more predicted hostnames based on detecting a user gesture for a predetermined period of time, wherein the selecting occurs prior to a user performing another user gesture;
   making a DNS lookup call for at least one of the one or more URL hostnames that are not cached by a DNS cache, wherein the making occurs in parallel with the selecting and prior to the another user gesture; and
   caching at least one IP address provided by a DNS resolver for the one or more URL hostnames in the DNS cache in preparation for a user hostname request based on the user gesture.

2. The method of claim 1, wherein the selecting and making steps are performed by one or more parallel threads.

3. The method of claim 1 further comprising gathering the one or more URL hostnames from one or more URL links in a web page prior to the user selecting a URL link in the web page.

4. The method of claim 1 further comprising:
   determining a context associated with the one or more one or more uniform resource locator (URL) hostnames for DNS pre-fetch resolution, wherein the context identifies a value of the one or more URL hostnames to the user; and
   receiving at least one of the one or more URL hostnames for DNS pre-fetch resolution based on the context and prior to the user gesture.

5. The method of claim 4, wherein the receiving comprises:
   identifying anchor tags in a web page associated with the one or more URL hostnames; parsing the anchor tags; and
   extracting the one or more URL hostnames from the parsed anchor tags.

6. The method of claim 4, wherein the receiving comprises:
   augmenting a link tag associated with the one or more URL hostnames, the augmenting including:

replacing a relationship value in the link tag, such that the relationship value indicates a prediction of the one or more URL hostnames that are available for pre-fetching.

7. The method of claim 4, wherein the receiving comprises:
scanning a web page associated with the one or more URL hostnames;
setting a limitation on a quantity of the one or more URL hostnames that are pre-fetched, wherein the limitation is based on a total number of URL links found during the scan of the web page; and
selecting the one or more URL hostnames based on the limitation, wherein the one or more URL hostnames are gathered based on the value identified by the context associated with the one or more URL hostnames.

8. The method of claim 1, wherein the selecting includes:
selecting the one or more URL hostnames when a mouse pointer appearing over one or more URL links on a web page for the predetermined period of time.

9. The method of claim 1, further comprising:
storing DNS pre-fetch information associated with the one or more URL hostnames, wherein the DNS pre-fetch information is at least one of a DNS resolution tracking information for a DNS task and a transition time for the DNS task.

10. The method of claim 1 further comprising temporarily storing the one or more URL hostnames until a thread passes the one or more hostnames to an API for DNS pre-fetch resolution.

11. The method of claim 1, further comprising passing the one or more URL hostnames as an array.

12. The method of claim 1 further comprising updating pre-fetch information for the one or more URL hostnames in a data structure prior to discarding the IP address.

13. The method of claim 1 further comprising determining a cache eviction time for the one or more URL hostnames.

14. The method of claim 13, wherein the making step further comprises making DNS lookup calls for only the one or more URL hostnames that have not had a DNS lookup call within the determined cache eviction time.

15. The method of claim 1, wherein the making step further comprises limiting DNS lookup calls for the one or more URL hostnames based upon a number of URL links on a web page.

16. The method of claim 1, wherein selecting includes selecting the one or more URL hostnames from the one or more predicted hostnames based upon a result of auto-completion logic.

17. A system for domain name system (DNS) pre-caching comprising:
a gatherer implemented on a computing device and configured to select and gather one or more uniform resource locator (URL) hostnames from one or more predicted hostnames while a user gesture is detected for a predetermined period of time and prior to a user performing another gesture; and
a DNS pre-fetcher implemented on the computing device and configured to make a DNS lookup call for at least one of the one or more URL hostnames during the detecting activity, wherein an IP address for the at least one URL hostname is cached in a DNS cache in preparation for the user hostname request based on the user gesture, and the DNS lookup call is made in parallel with the selection of the URL hostnames.

18. The system of claim 17, further comprising a renderer configured to pass the at least one URL hostname to the DNS pre-fetcher, wherein at least one of the DNS pre-fetcher and the renderer are configured to perform tasks using one or more parallel threads.

19. The system of claim 17, wherein the gatherer is further configured to select the one or more URL hostnames from one or more URL links in a web page prior to the user selecting a URL link in the web page.

20. A non-transitory computer readable storage medium having control logic stored therein that, in response to execution by a computing device, causes the computing device to perform operations, the control logic comprising:
a first computer readable program code to cause the computing device to select one or more uniform resource locator (URL) hostnames for DNS pre-fetch resolution from one or more predicted hostnames based on detecting a user gesture for a predetermined period of time, wherein the selection of the one or more URL hostnames occurs prior to the user performing another gesture; and
a second computer readable program code to cause the computing device to make a DNS lookup call for at least one of the one or more URL hostnames that are not cached by a DNS cache, wherein the making occurs in parallel with the selection and prior to the user hostname request.

* * * * *